UNITED STATES PATENT OFFICE.

VALERIUS KOBELT, OF BERLIN-SCHÖNEBERG, GERMANY.

PROCESS FOR THE ELIMINATION OF MANGANESE AND IRON FROM WATER.

1,253,840.

Specification of Letters Patent.   Patented Jan. 15, 1918.

No Drawing.   Application filed January 21, 1915.   Serial No. 3,554.

*To all whom it may concern:*

Be it known that I, VALERIUS KOBELT, a subject of the Emperor of Germany, residing at Berlin-Schöneberg, Germany, have invented certain new and useful Improvements in Processes for the Elimination of Manganese and Iron from Water; and I do hereby declare the following to be a full, clear, and exact description of the invention, such as will enable others skilled in the art to which it appertains to make and use the same.

It is well known that in order to precipitate manganese compounds dissolved in water, a large excess of permanganate has been added thereto. This process is objectionable, for the reason that such excess remains in the water so purified; and attempts to remove this objection by means of zeoliths have proven unsuccessful.

By my invention I am able to simultaneously eliminate both iron and manganese from water by a most simple method.

This method consists in the employment of highly porous natural bodies as filter media for the water, which bodies on account of their porosity not only present a large surface to the water, but they also act by catalysis on the compounds of iron and manganese.

By the employment of these extremely intensely acting catalytic materials the oxygen contained in the chalybeate water is quite sufficient for the oxidation of the dissolved protoxid compounds contained in solution therein, so that oxygen is not added, much less an excess thereof, and in reality the oxygen content is diminished.

Before the water comes into contact with the catalyzer the dissolved iron and manganese compounds are changed from their state of solution to a gelatinous state by the addition of a very small quantity of permanganate of potash, by no means more than from .0001 to .0003 per cent.

Such quantity is much less than has heretofore been used, or found desirable or necessary.

By practical tests I have found that apparently only a small incitation is required by means of very small quantities of permanganate of potash or other suitable peroxid, to change, by intensely operating catalytic substances, the gelatinous iron and manganese into the solid state, or to convert the gelatinous form into the solid oxid and thus remove the iron and manganese from the water.

As porous materials may be used trachytes or their tuffs, and similar volcanic rocks. These materials operate at once, without the necessity of filtering, for some time. When, however, volcanic scoria or gravel are used a catalytic effect is not obtained until mud is deposited on the filter media. The catalytic effect may be increased by leaving the deposited manganese oxids in the filter material, so that these oxids may also operate.

Materials liberating oxygen, such as peroxids of the metals insoluble in water, of which the per-oxids of iron and manganese are most commonly present when added to the catalytic material have an effect somewhat like that of the manganese oxids, when left in the filter. These oxids when present in the filter material, with the oxygen dissolved in the water and always present therein in natural waters, in the presence of the highly porous catalytic substance of which the filtering material consists, accelerate and complete the conversion of the iron and manganese combinations existing in the water, into oxids and hydrates insoluble in water, so that these elements are completely separated.

I claim—

1. Process for the elimination of manganese and iron from water, which comprises adding a soluble permanganate to the water and filtering the water through a catalytic body of high porosity.

2. Process for the elimination of manganese and iron from water, which comprises adding a soluble permanganate, less than sufficient to precipitate the contents of iron and manganese in the water, and filtering through a catalytic body of high porosity.

3. Process for the elimination of manganese and iron from water, which comprises adding to the water a soluble permanganate, and filtering through a catalytic body of high porosity mixed with a material capable of generating oxygen when reacting with constituents of the water.

4. Process for the elimination of manganese and iron from water, which comprises adding a soluble permanganate, less than sufficient to precipitate the contents of the water in iron and manganese, and filtering through a catalytic body of high porosity mixed with a material capable of generating oxygen.

5. Process for the elimination of manganese and iron from water, which comprises adding a soluble permanganate to the water and filtering through a catalytic body of high porosity, and thereby causing the oxid of manganese resulting from the permanganate to act in conjunction with the oxygen content of the water to precipitate the iron and manganese originally present in the water.

6. Process for the elimination of manganese and iron from water, which comprises adding to the water a soluble permanganate, less than sufficient to precipitate the contents of the water in iron and manganese, and filtering the water through a catalytic body of high porosity, wherein oxid of manganese has accumulated and remains.

7. Process for the elimination of manganese and iron from water, which comprises adding a suitable oxidant to the water to incite the oxidation of the iron and manganese, and completing the oxidation by the aid of a catalyst in conjunction with the usual oxygen content of the water and filtering out the oxids thus produced.

8. Process for the elimination of manganese and iron from water, which comprises adding sufficient soluble permanganate to the water to initiate the oxidation of the iron and manganese, and completing the oxidation during filtering by a catalyst acting in conjunction with the normal oxygen content of the water.

9. The process for the elimination of manganese and iron from water, which comprises adding sufficient soluble permanganate to the water to incite oxidation of the iron manganese content, and completing the oxidation by filtration through a filter of the trachyte tuff type.

In testimony that I claim the foregoing as my invention, I have signed my name in presence of two subscribing witnesses.

VALERIUS KOBELT.

Witnesses:
HENRY HASPER,
WOLDEMAR HAUPT.